United States Patent

Palumbo et al.

(10) Patent No.: US 6,723,783 B2
(45) Date of Patent: Apr. 20, 2004

(54) POLYMERS AND OTHER GROUPS ATTACHED TO PIGMENTS AND SUBSEQUENT REACTIONS

(75) Inventors: Paul S. Palumbo, West Newton, MA (US); Curtis E. Adams, Watertown, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/754,988

(22) Filed: Jan. 5, 2001

(65) Prior Publication Data

US 2002/0005146 A1 Jan. 17, 2002

Related U.S. Application Data

(60) Provisional application No. 60/174,995, filed on Jan. 7, 2000.

(51) Int. Cl.[7] .................. C08L 79/00; C08L 33/02; C08L 33/08; C08L 29/04; C08L 79/02; C09D 11/02

(52) U.S. Cl. .................. 524/555; 524/556; 524/557; 523/160

(58) Field of Search ................. 523/160, 161; 106/31.6; 524/495, 555, 556, 557

(56) References Cited

U.S. PATENT DOCUMENTS

| | | | |
|---|---|---|---|
| 4,909,852 A | 3/1990 | Atkinson | 106/448 |
| 5,281,261 A | 1/1994 | Lin et al. | 106/20 R |
| 5,418,277 A | 5/1995 | Ma et al. | 524/520 |
| 5,545,504 A | 8/1996 | Keoshkerian et al. | 430/137 |
| 5,554,739 A | 9/1996 | Belmont | 534/885 |
| 5,571,311 A | 11/1996 | Belmont et al. | 106/20 |
| 5,630,868 A | 5/1997 | Belmont et al. | 106/31.75 |
| 5,698,016 A | 12/1997 | Adams et al. | 106/316 |
| 5,713,988 A | 2/1998 | Belmont et al. | 106/31.6 |
| 5,714,993 A | 2/1998 | Keoshkerian et al. | 347/95 |
| 5,716,435 A * | 2/1998 | Aida et al. | 106/31.85 |
| 5,766,268 A * | 6/1998 | Bruhnke | 8/647 |
| 5,837,045 A | 11/1998 | Johnson et al. | 106/31.85 |
| 5,851,280 A | 12/1998 | Belmont et al. | 106/472 |
| 5,885,335 A | 3/1999 | Adams et al. | 106/316 |
| 5,895,522 A | 4/1999 | Belmont et al. | 106/31.6 |
| 5,900,029 A | 5/1999 | Belmont et al. | 8/550 |
| 5,914,806 A | 6/1999 | Gordon, II et al. | 359/296 |
| 5,919,846 A * | 7/1999 | Batlaw et al. | 524/83 |
| 5,922,118 A | 7/1999 | Johnson et al. | 106/31.6 |
| 5,952,429 A * | 9/1999 | Ikeda et al. | 525/326.1 |
| 5,964,935 A | 10/1999 | Chen et al. | 106/401 |
| 5,968,243 A | 10/1999 | Belmont et al. | 106/31.65 |
| 6,042,643 A | 3/2000 | Belmont et al. | 106/472 |
| 6,068,688 A | 5/2000 | Whitehouse et al. | 106/31.65 |
| 6,103,380 A | 8/2000 | Devonport | 428/403 |
| 6,150,433 A * | 11/2000 | Tsang et al. | 523/160 |
| 6,221,143 B1 | 4/2001 | Palumbo | 106/31.6 |
| 6,221,932 B1 * | 4/2001 | Moffatt et al. | 523/160 |
| 6,235,829 B1 * | 5/2001 | Kwan | 524/495 |
| 6,323,257 B1 | 11/2001 | Moffatt et al. | 523/160 |

FOREIGN PATENT DOCUMENTS

| | | | |
|---|---|---|---|
| EP | 0 677 556 A2 | 10/1995 | ........... C09B/67/08 |
| EP | 0 688 836 A2 | 12/1995 | ........... C09D/11/02 |
| EP | 0 839 883 A2 | 5/1998 | ........... C09D/11/00 |
| GB | 2 330 842 | 5/1999 | ........... C09B/67/54 |
| JP | 57-21466 | 2/1982 | ........... C09D/11/00 |
| WO | WO97/47697 | 12/1997 | ........... C09D/11/00 |
| WO | WO99/23174 | 5/1999 | ........... C09C/1/56 |
| WO | WO99/31175 | 6/1999 | ........... C08K/9/04 |
| WO | WO99/38921 | 8/1999 | ........... C09C/1/56 |
| WO | WO99/51690 | 10/1999 | ........... C09B/69/00 |
| WO | WO99/63007 | 12/1999 | ........... C09C/1/56 |
| WO | WO00/05313 | 2/2000 | ........... C09C/3/10 |
| WO | WO00/22051 | 4/2000 | ........... C09C/1/56 |
| WO | WO00/43446 | 7/2000 | ........... C08K/9/06 |
| WO | WO00/52102 | 10/2000 | ........... C09B/67/00 |
| WO | WO00/68321 | 11/2000 | ........... C09C/3/10 |
| WO | WO01/25340 | 4/2001 | ........... C09B/67/20 |

OTHER PUBLICATIONS

Morrison, Robert Thornton and Boyd, Robert Neilson; Organic Chemistry 5th Ed., Allyn and Bacon Inc., Boston, 1987 (pp. 1035 and 1048–1049).*
JP11256066 A to Tokai Carbon Co. Ltd., Publication Date Sep. 21, 1999 Abstract Only (from Patent Abstracts of Japan).
International Search Report for PCT/US01/00380, mailed May 7, 2001.
JP11246806 A to Toyo Ink Mfg. Co. Ltd. Publication Date Sep. 14, 1999 Abstract Only (from Patent Abstracts of Japan).
JP11080636 A to Canon Inc., Publication Date Mar. 26, 1999 Abstract Only (from Patent Abstracts of Japan).
Written Opinion for PCT/US01/00380, mailed Oct. 31, 2001.
JP64–79279A to Nippon Shokubai Kagaku Kogyo Co, Ltd. (JP401079279A) Abstract Only (1989).

* cited by examiner

*Primary Examiner*—Callie Shosho

(57) ABSTRACT

Methods of making a modified pigment by reacting a first chemical group and a second chemical group to form a pigment having attached a third chemical group. The first chemical group includes at least one nucleophile and the second chemical group includes at least one electrophile, or vice versa. Resulting modified pigments, and ink compositions containing such pigments, are also described.

27 Claims, No Drawings

POLYMERS AND OTHER GROUPS ATTACHED TO PIGMENTS AND SUBSEQUENT REACTIONS

This application claims priority to U.S. Provisional Patent Application Ser. No. 60/174,995, filed on Jan. 7, 2000.

BACKGROUND OF THE INVENTION

1. Field of the Invention

The present invention relates to pigments and chemical groups attached onto pigments. More particularly, the present invention relates to improved methods for attaching a variety of different types of chemical groups, such as polymers, onto pigments.

2. Description of Related Art

Methods exist for the grafting of polymers to the surface of carbon black which contain specific surface groups (e.g., phenols and carboxyl groups), such as with channel blacks. However, these methods are not easily applied to the surface grafting of polymers onto furnace and acetylene blacks, because these carbon blacks generally lack these specific functional groups. The methods described herein have the advantage that allows for the surface grafting of polymers to the surface of carbon black, regardless of the inherent functional groups.

Pigments having polymers grafted to their surface have been found to provide improved performance when used in an inkjet ink. These materials afford printed images which are notably more waterfast, highlighter smearfast, and smudge resistant than conventional inks. The printed images also show improved edge acuity and intercolorbleed properties. The dispersion stability is also greatly improved.

U.S. Pat. No. 5,851,280 discloses methods for the attachment of organic groups onto pigments, including via a diazonium reaction wherein the organic group is part of the diazonium salt. Through reaction with a pigment, like carbon black, the organic group attaches onto the pigment. These modified pigments can be used in a variety of applications, such as inks, inkjet inks, coatings, toners, plastics, rubbers, and the like.

There is a desire by those in the industry to further develop methods of attaching organic groups, and primarily polymers, onto pigments for the same and similar applications described above. These additional methods may provide advantageous alternatives to forming modified pigments.

SUMMARY OF THE INVENTION

A feature of the present invention is to provide improved methods for the attachment of chemical groups, including polymers, onto pigments.

A further feature of the present invention is to provide novel modified pigments and compositions containing them, such as inks and coatings.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purpose of the present invention, as embodied and broadly described herein, the present invention relates to a method of making a modified pigment by attaching at least one chemical group onto a pigment. The method involves reacting a pigment having attached a first chemical group with a second chemical group to form a pigment having attached a third chemical group, wherein the second chemical group reacts with the first chemical group to form the third chemical group. The first chemical group contains at least one nucleophile and the second chemical group contains at least one electrophile, or vice versa. Preferably, in this method, the second chemical group is a polymer or contains a polymer.

The present invention further relates to a modified pigment comprising a pigment having attached at least one organic group, wherein the organic group comprises the reaction product of at least one (2-sulfatoethyl)-sulphone group and at least one nucleophilic polymer.

The present invention further relates to a modified pigment comprising a pigment having attached at least one organic group, wherein the organic group comprises the reaction product of at least one benzoic acid group and at least one nucleophilic polymer.

The present invention further relates to a modified pigment comprising a pigment having attached at least one organic group, wherein the organic group comprises the reaction product of at least one electrophile and at least one nucleophilic polymer; and an acylating agent.

The present invention further relates to ink compositions containing the modified pigments described above. The modified pigments of the present invention also have a variety of uses in coatings, plastics, rubbers, toners, and the like.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to novel and improved methods for attaching chemical groups onto pigments. The chemical groups are preferably organic groups and more preferably include polymeric groups.

In more detail, the present invention involves a method of attaching at least one chemical group onto at least one type of pigment. The method involves reacting a pigment having attached a first chemical group and a second chemical group such that the first chemical group and second chemical group react with each other to form a third chemical group, which is attached to the pigment. The first chemical group contains at least one nucleophile and the second chemical group contains at least one electrophile or vice versa; meaning the first chemical group contains at least one electrophile and the second chemical group contains at least one nucleophile.

For purposes of the present invention, the pigment can be any type of pigment conventionally used by those skilled in the art, such as black pigments and other colored pigments.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Colombian Chemical Corporation) and MA100 and MA440 available from Mitsubishi Chemical Corporation. The colored pigment will typically have a wide range of BET surface areas, as measured by nitrogen adsorption. Preferably, the colored pigment has a surface area equal to or greater than 85 $m^2/g$, and more preferably equal to or greater than about 100 $m^2/g$, thereby corresponding to a smaller primary/aggregate particle size. Such surface areas have been found to provide for a more uniform distribution and efficient level of treating agent on the surface of the pigment and a higher percent yield of the surface-modified colored pigment after post processing techniques. If the preferred higher surface area of the colored pigment (thereby corresponding to a smaller particle size) is not readily available, it is well recognized by those skilled in the art that the colored pigment may be subject to conventional size comminution or reduction techniques, such as ball or jet milling, to reduce the pigment to the desired particle size.

The pigment may also be chosen from a wide range of conventional colored pigments. The colored pigment can be blue, black, brown, cyan, green, white, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). The color pigment can have a wide range of BET surface areas, as measured by nitrogen adsorption.

Other examples of pigments include Hostafinet series such as Hostafine® Yellow GR (Pigment 13), Hostafine® Yellow (Pigment 83), Hostafine® Red FRLL (Pigment Red 9), Hostafine® Rubine F6B (Pigment 184), Hostafine(® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm® Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm® Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen® Red 3871K (BASF), Paliogen® Red 3340 (BASF), and Lithol Fast Scarlet L4300 (BASF).

Besides pigments, the present invention can be used to modify carbon materials such as a carbon fiber, a graphite fiber, a graphite powder, carbon cloth, vitreous carbon product, and an activated carbon product and the like.

Mixtures of different pigments and/or carbon materials can be used in the methods of the present invention.

The first chemical group can be attached to the pigment in a variety of ways using techniques know to those of ordinary skill in the art. Preferably, the first chemical group is attached to the pigment by way of a diazonium reaction, which can be accomplished following the methods and components described in U.S. Pat. Nos. 5,922,118; 5,900,029; 5,895,522; 5,885,335; 5,851,280; and 5,837,045, all incorporated in their entireties by reference herein. In this way, the first chemical group is preferably part of a diazonium salt which is reacted with the pigment in order to form a pigment having attached the first chemical group. The first chemical group is therefore preferably directly attached to the pigment. It is within the bounds of the methods of the present invention to use a pigment having already attached the first chemical group, and the manner in which the attachment of the first chemical is accomplished is not critical.

The first chemical group preferably comprises an organic group, and more preferably contains at least one aromatic group, which contains preferably at least one electrophile. As stated earlier, this chemical group can alternatively or in addition contain at least one nucleophile when the second chemical group, to be discussed in more detail below, contains at least one electrophile. A specific example of a preferred first chemical group is phenyl-(2-sulfatoethyl)-sulphone.

The pigment having attached the first chemical group is then reacted with a second chemical group. Preferably, the second chemical group contains at least one polymeric group and more preferably contains one or more polyamines, polyalkylene oxides, polyols, or polyacrylates, including salts and derivatives thereof. Specific preferred examples are polyethyleneimine or poly(vinyl alcohol). As indicated earlier, the second chemical group contains at least one nucleophile when the first chemical group contains at least one electrophile. Thus, preferably the second chemical group is a nucleophilic polymer. Alternatively, the second chemical group can contain at least one electrophile when the first chemical group contains at least one nucleophile.

The first chemical group and/or the second chemical group can have more than one electrophile or nucleophile present. Furthermore, when the first chemical group, for instance, contains at least one electrophile, this first chemical group can also contain one or more nucleophiles. In other words, the first chemical group and/or second chemical group can contain both electrophiles and nucleophiles. Furthermore, the first chemical group and/or second chemical group can contain more than one type of nucleophile and/or electrophile. For instance, the first chemical group which preferably contains at least one electrophile can contain more than one type of electrophile. The first chemical group and/or second chemical group are preferably organic groups. More preferably, the first chemical group is at least one alkyl or aromatic group. Preferred electrophiles and nucleophiles which can be part of the first or second chemical groups are set forth in Table 1 below. Note that any electrophilic group can be used with any suitable nucleophilic group (and vice versa)

TABLE 1

Possible Electrophiles and Nucleophiles

| "Electrophile" groups A | "Nucleophile" groups Z |
|---|---|
| Carboxylic acids and esters and sulfonyl chlorides | Amines, hydroxylamine, hydrazines |
| Acid chlorides, acyl azides, sulfonyl azides, and isocyanates, isothiocyanates, and blocked forms of isocyanates (for example, malonate adducts) | Alcohols and alcoholates |
| Ketones and aldehydes | Thiols and thiolates |
| Anhydrides | Carboxylates, and salts of thioacids and xanthates |
| Amides, hydroxymethyl amides, and melamine-formaldehyde adducts | Amides, hydrazides, sulfonamides, and acylated sulfonamides |
| Imides, such as N-substituted phthalimides | Oximes |
| α,β-Unsaturated ketones, aldehydes, sulphones, sulfoxides, phosphonates, etc., and precursors to these as a result of β-elimination | Carbanions, such as malonate and cyanoacetate |
| Alkylating agents, such as alkyl halides, epoxides, thioepoxides, aziridines, mono and disubstituted halo-triazines, oxazolines, alkyl sulfonates, sulfates, and phosphonates, etc. | Imides, such as phthalimide and succinimide |
| Aromatic compounds which undergo addition-elimination reactions, such as o-fluoronitrobenzene. | Electron rich aromatic rings |
| Imines | |

Preferably, when the first chemical group and the second chemical group are reacted, a covalent bond or other bond forms between the two groups which results in the third chemical group which is ultimately attached to the pigment. Depending upon the first chemical group and the second chemical group used, the resulting product (which is the third chemical group) may contain some by-products which are not part of the third organic group. In other words, the first chemical group and second chemical group may react with each other wherein the resulting reaction only produces the third chemical group (e.g., a reaction of an amine with an epoxide) or the resulting reaction may result in the formation of the third chemical group and by-products (e.g., a reaction of amine with an aldehyde to yield an imine wherein water is a by-product).

Thus, the resulting third chemical group preferably is an aromatic group directly attached to the pigment and at least one polymeric group is attached onto the aromatic group via a linking group as defined, for example, by the reaction A+Z selected from Table 1 above and further detailed in the examples below.

The reaction and resulting bond between the first chemical group and the second chemical group can be formed by any type of reaction, such as $S_N2$ displacement reactions, 1,2 or 1,4 addition reactions, condensation reactions (such as esterification and amidation), acylation reaction, ring-forming reactions, or any other number of known chemical reactions which preferably leads to stable bonds (e.g., covalent bonds).

As previously discussed, preferably the second chemical group comprises at least one polymeric group. Further examples of commercially available nucleophilic polymers which can be used in the present invention include, but are not limited to, polyamines, (such as polyvinylamine, polyallylamine, branched or linear polyethyleneimine—e.g., Lubrasols™—and salts thereof, and derivatives of polyethyleneimine such as acylated polyetheyleneimine), dendrimers (such as PAMAM Starburst™ dendrimers); polyalkylene glycol derivatives (such as polyethylene glycol and polypropylene glycol derivatives and amine-substituted polyethylene and polypropylene glycols); proteins such as hydrolyzed gelatin; polylysine; polyols (such as polyvinyl alcohol and vinyl alcohol copolymers); polyacrylates (such as amine-substituted and alcohol-substituted polyacrylates); and the like.

The process of the present invention can be repeated one or more times to attach additional groups onto the third chemical group. When repeating steps, the attached third chemical group behaves like the original first chemical group, and thus, an additional second chemical group is used to react with the third chemical group. If the original third chemical group contained at least one nucleophile, then when repeating the process, the additional second chemical group preferably contains at least one electrophile and vice versa if the original third chemical group contained at least one electrophile. When repeating, the chemical groups can be the same or different from those used in the original process steps.

In other words, the modified pigment containing the third chemical group can be further reacted and modified. Preferably, the third chemical group is further modified by reaction with an acylating agent, for example, with a carboxylic acid, a derivative of a carboxylic acid, or an anhydride. More preferred is the acylation of the third chemical group with succinic anhydride or polyacrylic acid. This acylation reaction is most preferred when the third chemical group contains polyamines, such as polyethyleneimine.

In addition, as a modification to the above-described method, a diazonium salt precursor having the first chemical group can be first reacted with the second chemical group to form a reaction product which is a diazonium salt precursor having the third chemical group. This diazonium salt precursor having the third chemical group can then be converted to a diazonium salt containing the third chemical group and then attached onto the pigment by way of a diazonium reaction as described above. The diazonium salt precursor is a group that is typically stable to the reaction conditions required to react the first chemical group with the second chemical group, and can then be converted to a diazonium salt. Examples of the precursor group include an aromatic group bearing a nitro group and having the first chemical group present. In converting the precursor, one or more steps can be used. The preferred process involves the reduction of the nitro group to an aromatic amino group which is then reacted with sodium nitrite and acid.

More than one type of reaction product can be attached to the pigment. Therefore, a variety of different third chemical groups can be on the same pigment. In other words, different types of first chemical groups can be attached to the pigment. Further, different types of second chemical groups can be reacted with one or more types of chemical groups. Thus, any combination of different first chemical groups and second chemical groups are possible which leads to the formation of multiple types of third chemical groups that are present on the pigment.

In general, the pigment having attached the first chemical group is mixed together with the second chemical group preferably in an aqueous media, such as water, to form the reaction product having the third chemical group. Preferably, this reaction occurs at room temperature, however other temperatures can be used. The modified pigment formed can then be post-processed by diafiltration and/or ion exchange methods and/or other methods as with other modified pigments as described in the patents above.

The present invention further relates to a modified pigment comprising a pigment having attached at least one organic group, wherein the organic group comprises the reaction product of the first chemical group and the second chemical group. Preferably, the attached group comprises the reaction product of at least one first chemical group (e.g., an aromatic or alkyl group) with at least one nucleophilic or electrophilic organic group (e.g., polymer). More preferably, the organic group attached to the modified pigment of the present invention is the reaction product of at least one (2-sulfatoethyl)-sulphone with at least one nucleophilic polymer. Most preferred is wherein the (2-sulfatoethyl)-sulphone is phenyl-(2-sulfatoethyl sulphone) and, further, wherein this group is directly attached to the pigment. Further, the organic group attached to the modified pigment of the present invention is preferably the reaction product of at least one benzoic acid group with at least one nucleophilic polymer, and most preferred is wherein the benzoic acid group is directly attached to the pigment. Preferably the nucleophilic polymer comprises at least one poly(vinyl alcohol), polyethyleneimine, polyalkylene glycol, or combinations thereof.

The modified pigments of the present invention can be used in a number of end use applications as described in the patents mentioned above. The various formulations and manners of introduction to form the variety of end uses are also described in these patents. Preferably, the modified pigments are used in inks (e.g., inkjet inks) and coatings and the like. Generally, the modified pigment is present with at least one liquid vehicle (e.g., aqueous or non-aqueous) and can also include conventional ingredients, such as humectants and the like.

The present invention will be further clarified by the following examples, which are intended to be purely exemplary of the present invention.

EXAMPLES

Examples 1–11

For Examples 1–11, a two step reaction sequence was followed, as shown in Equation 1, wherein a first chemical group containing an electrophile (A) is first attached to the pigment surface and then a second chemical group (a polymeric or other species) containing a nucleophile (Z) is added in a subsequent step. The scheme below is meant to be illustrative, but not limiting. Table 1 above provides examples of A to Z.

Equation 1

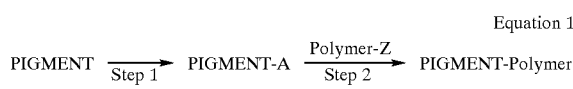

Examples are given below for A=(2-sulfatoethyl)-sulphone (2SES), carboxylic acid, and acyl azide, and Z=alcohol and amine.

An exemplary description of the 2SES mechanism is shown in Equation 2.

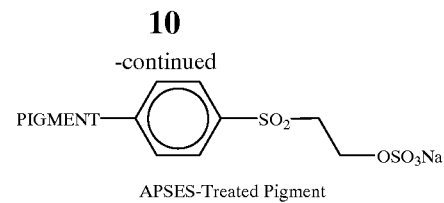

APSES-Treated Pigment

The following general procedure was followed for preparing these modified pigments. Results are shown in Table 2 below.

Equation 2

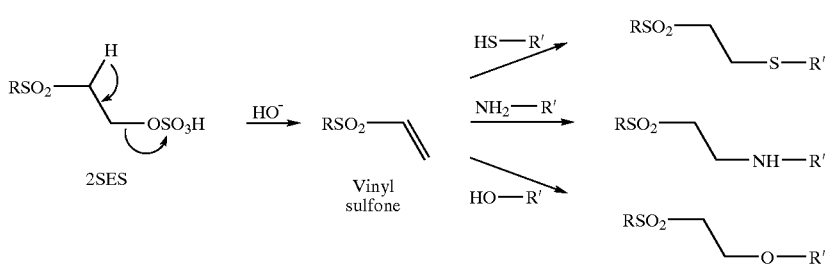

The (2-sulfoethyl)sulphone (2SES) functionality is an alkylating agent precursor and therefore an electrophile. Base catalyzed elimination of the 2SES group leads to a vinyl sulphone which subsequently reacts with amines, alcohols, and thiols. Many useful compounds containing nucleophiles are available commercially to carry out this sequence.

Examples A–D—Attachment of 2SES

In the following examples, the 2SES group was attached to the pigment by diazotization of aminophenyl-(2-sulfatoethyl)-sulphone (APSES), shown in Equation 3 below. Subsequent reaction of this first chemical group with several nucleophilic polymers is therefore possible.

Equation 3

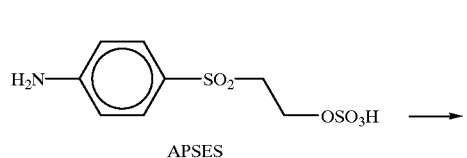

APSES

Into a ProcessAll Mixer was combined carbon black powder and APSES in distilled water according to the specified amounts listed in the table below. This mixture was heated at 50–55° C. and mixed at 300 RPM for 10 minutes. To this was added 25% (by weight of ingredients) sodium nitrite (see Table 2 below for amounts) over 10–15 minutes and an additional 50 ml of distilled water. The resultant mixture was heated at 60° C. for 2 hours. The contents were removed by dilution with water to a final concentration of ~15% (by weight) solids and then purified by centrifugation and diafiltration. The resulting product was a fine particle dispersion in water. Sodium determination was performed on this dispersion directly, with an Orion ISE probe. The results are reported on a dry carbon black basis. Sulfur analysis was performed on dry carbon black which was Soxhlet extracted with methanol for an overnight period.

TABLE 2

| Ex | CB | CB (g) | Water (g) | 25% NaNO$_2$ (g) | APSES (g) | S (%) | Na + (ppm) | Na + (mmol/g) | UPA mV (nm) |
|---|---|---|---|---|---|---|---|---|---|
| A | Black Pearls ® 700 | 500 | 920 | 31.4 | 42.61 | 1.51 | 4,536 | 0.2 | 135 |
| B | Black Pearls ® 700 | 500 | 900 | 52.3 | 71.01 | 2.18 | 7,100 | 0.31 | 124 |
| C | Black Pearls ® 700 | 500 | 850 | 104.6 | 142.02 | 2.48 | 9,281 | 0.4 | 146 |
| D | Monarch ® 1100 | 500 | 850 | 104.6 | 142.02 | 2.99 | 11,028 | 0.48 | 70 |

Examples 1–7: Reaction of APSES-treated pigments with a polyamine (A=2SES Z=Amine):

The following general procedure was followed for preparing these modified pigments.

A 10–15% solids dispersion of APSES-treated carbon black was added dropwise at room temperature, over 1 hour, with vigorous stirring, to a solution of polyethyleneimine (1–10 molar excess of polymer over electrophile functionality) in distilled water (volume equivalent to dispersion volume). The resultant mixture was then stirred for an additional 18–48 hours. The crude product thus obtained was purified by diafiltration using first 10 volumes of 0.1M NaOH and then 10 volumes of distilled water. The resulting purified products had the following physical and print properties.

After about 1 hour the heat was reduced and stirring continued overnight. The resulting dispersion was poured into dialysis bags (Spectra/Por CE 300,000MW cutoff) and dialyzed against distilled water (10 water exchanges). The product was tested for % polymer, as volatiles determined by TGA. This dialyzed product after evaporation of water was 21.23% polymer (volatiles) by weight.

Median particle size in this dispersion was 200 nm. The zeta potential was −17.7 mV. A drawdown made from a 5% solids dispersion had an optical density of 1.48, was dry to the touch at 8 min., and was waterfast within 5 minutes.

Example 9

Reaction of PEG 750 with APSES-Treated Carbon Black (A=2SES, Z=Alcohol)

To a dry 250 mL 3-necked round bottomed flask was charged 0.25 g sodium hydride (60% in oil) under a nitrogen

TABLE 3

Secondary Reaction of Polyamines with APSES-Treated Carbon Black *

| Ex: | 1 | 2 | 3 | 4 | 5 | 6 | 7 |
|---|---|---|---|---|---|---|---|
| APSES Product: (see Table 1) | D | B | B | B | B | C | A |
| Polyamine | PEHA | PEHA | PEI (1800) | PEI (1200) | PEI (600) | PEI (1200) | PEI (1200) |
| Molar ratio | 10:1 | 10:1 | 6:1 | 5:1 | 5:1 | 5:1 | 5:1 |
| Work-up | Acetic acid, diaf'd | Acetic acid, diaf'd | NaOH, water diaf'd | NaOH, water diaf'd | NaOH, water diaf'd | NaOH, water diaf'd | NaOH, water diaf'd |
| pH | 5.35 | 5.15 | 8.4 | 9.75 | 9.0 | 8.41 | 8.38 |
| S (%) | 3.16 | n.d. | 2.12 | 1.59 | 1.75 | 2.17 | 1.48 |
| N (%) | 1.93 | n.d. | 2.82 | 2.53 | 2.14 | 2.77 | 2.52 |
| % polymer | 6% | n.d. | 9% | 8% | 7% | 9% | 8% |
| UPA mV (nm): | 68.2 | 168.5 | 151.1 | 161.7 | 184.2 | 145.0 | 192.7 |
| UPA 100% (nm) | 204.4 | 408.8 | 486.1 | 408.8 | 687.5 | 578.1 | 687.5 |
| Print OD | 1.09 | 1.28 | 1.25 | 1.28 | 1.37 | 1.15 | 1.34 |
| ICB | Excel. | Excel. | Excel. | Excel. | Excel. | Excel. | Excel. |
| WF | 10–60 min | 5–60 min | 5 min | 1–5 min | 1–5 min | 5–10 min | 1–5 min |
| Highlighter Smear | Good | Good | Excel. | Excel. | Good | Good | Excel. |

* Molar ratio = moles of polymer per mole of sodium present on the surface of the carbon black; PEHA = pentaethylene hexamine; PEI() = polyethyleneimine (average MW); diaf'd = diafiltered using a PALL FILTRON diafiltration cartridge membrane with MW cut-off = 10,000; Print OD = average Densitometer optical density reading obtained for a printed black square on a set of six paper types, printed with a Canon BJC4400 Inkjet printer in a standard formulation; ICB = qualitative intercolor bleed performance rating, judged primarily at the interface between adjacently printed black and yellow test bars (Excel. means no visible sign of bleed of black ink into the yellow ink); WF = waterfastness measure which tests how much time is required until no ink run-off is observed when 0.025 ml water is dripped across the print; Highlighter smear = qualitative measure of how much black ink is smeared when a standard fluorescent highlighter marker is rubbed across the printed text (Excel. means no visible ink is removed).

Example 8

Reaction of Polyvinyl Alcohol with APSES-Treated Carbon Black (A=2SES Z=Alcohol)

To a 250 mL 3-necked round bottom flask was charged 81.25 mL of a solution of APSES-treated carbon black, Example C. To this dispersion was added 13.2 g poly(vinyl alcohol) (MW 13,000–23,000) while being stirred with a mechanical agitator. The mixture was heated to reflux to dissolve the polymer. A solution containing 0.45 g sodium hydroxide was added to the refluxing dispersion over about 30 min.

atmosphere. The oil was removed by rinsing the solid with heptane. To this was added 82 g of dried poly(ethylene glycol) (750 MW, dried by concentrating from toluene). This mixture was heated to 50 C. and stirred for 90 min. To this was added 10 g of dry APSES-treated carbon black, Example C. This slurry was stirred at about 50° C. overnight.

The product slurry was diluted into tetrahydrofuran (THF) and precipitated by addition of hexane (5 parts THF/3 parts hexane). The product was isolated by filtration and further purified by Soxhlet extraction with 5:3 THF/hexane. The resulting product did not disperse well in water. Volatile content by TGA was 11.5% by weight. Median particle size of an aqueous dispersion was 687 nm and the zeta potential was −28.2 mV.

Example 10

Reaction of p-Aminobenzoic Acid (PABA)-Treated Carbon Blacks with poly(vinyl alcohol) (A=Carboxylic Acid, Z=Alcohol)

To 34 mL of a dispersion of Cab-O-Jet®-300 black dispersion (5 g solids) at 50–75° C. was added 6.5 g poly(vinyl alcohol) (MW 13,000–23,000) over about 10 min. The mixture was stirred to complete dissolution of the polymer. To this dispersion was added 0.275 mL conc. hydrochloric acid. The suspension was then evaporated in a forced air oven at 70° C. for 2½ days.

The solid was redispersed into 38 mL warm (75–80° C.) water with stirring. The resulting dispersion was poured into dialysis bags (Spectra/Por CE 300,000 MW cutoff) and dialyzed against distilled water (6 water exchanges). The product was tested for % polymer, as volatiles determined by TGA. This dialyzed product after evaporation of water was 19.81% polymer (volatiles) by weight. Median particle size for this dispersion was 268 nm.

Example 11

Preparation of PEI-Substituted Carbon Black via Reaction with Acyl Azide-Substituted Carbon Black (A=Acyl Azide, Z=Amine).

A PABA-substituted carbon black dispersion (BP700, PABA-substitution equivalent to ~0.55 mmol/g) was dried in a 100° C. oven for several hours to afford a black solid. This material was ground into a fine powder using a mortar and pestle under dry conditions. To 10 g of this resulting powder suspended in 50 g of dry DMF was added 1.4 g of diphenylphosphoryl azide, in one portion, at room temperature. This mixture was stirred under an atmosphere of dry nitrogen for 18 hours. During this time the suspension became a DMF dispersion. A portion of the resultant product was precipitated by addition to distilled water and the black solid then filtered, washed and dried in vacuo. Combustion analysis revealed that the sample contained 1.93% nitrogen, which corresponded to 0.46 mmol azide per g of solid. A portion of the above DMF solution (10 g) was added dropwise to a solution of 4.5 g PEI(1200) in 20 ml of distilled water. After stirring for 3 hours at room temperature, the mixture was diafiltered (10,000 MW cut-off membrane) using 10 volumes of 0.01M NaOH followed by 10 volumes of distilled water. The mixture was finally concentrated to ~12% solids. The resulting dispersion had physical properties which were very similar to Examples 4 and 6 as shown in Table 2.

Examples 12–14

The following example demonstrates the further reaction or modification of the modified carbon products.

Example 12

The Reaction of a Polyamino-Carbon Black with Succinic Anhydride

800 g of dispersion obtained in Example 2 (acetate salt, 12.71% solids) was pH adjusted to pH 8.2 by the addition of 2 M NaOH. To this stirred solution, at room temperature, was added 15.3 g of succinic anhydride in 2 g increments, while maintaining the pH at 8 to 8.5 by dropwise addition of 2 M NaOH. This required a total of 150.4 g of 2M NaOH. After the addition was completed the mixture was stirred for an additional 18 hours (overnight) at pH 8.1. The resultant mixture was purified by diafiltration (10,000 MW cutoff, Pall Filtron membrane) using first 10 volumes of 0.01M NaOH followed by 10 volumes of distilled water in the make-up stream. The resulting dispersion had the following properties: 8.35% solids, pH=10.19, viscosity (Brookfield)= 1.88 cP, surface tension=75.5 dynes/cm, UPA mean volume=156 nm.

Example 13

The Reaction of a Polyamino-Carbon Black with a Polyacid

500.0 g of the dispersion obtained in Example 2 (chloride salt, 12.5% solids) was added dropwise, with stirring, to a solution of 187.51 g Polyacrylic acid (MW=2000) in 1.9 L of de-ionized water. The resulting mixture was transferred to a pyrex dish and heated to dryness and baked at 150° C. for 15.5 hrs. After allowing the dried sample to cool to room temperature, the resultant solid residue was redispersed in 0.1 M NaOH using a Silverson high sheer mixer. While mixing, 1.0 M NaOH was added periodically until the pH was in the range of 11–12. This crude product was then purified by diafiltration (50,000 MW cutoff, Pall Filtron membrane), using 30 volumes of 0.1 M NaOH followed by 30 volumes of de-ionized water. The product was then filtered through a 0.5μ Pall Filter to afford a dispersion with the following physical properties: 11.2% solids, pH 10.2, viscosity (Brookfield)=3.4 cP, surface tension=72.3 dynes/ cm, UPA mean volume diameter=158 nm. TGA analysis showed 10–20% polymer had been attached.

Similar reactions were run with polystyrene co-acrylic acid, polystyrene co-maleic acid, and polyacrylic ester/acid polymers of MW 1000–10,000.

Example 14

The Reaction of a Polyamino Carbon Black with a Polyacid Followed by Ethanol

The procedure described for Example 14 was followed. However, after allowing the dried sample to cool to room temperature, the resultant solid residue was redispersed in ethanol rather than 0.1 M NaOH (as in Example 14). The material was redispersed in 95% ethanol and diafiltered (also with 95% ethanol) to afford a dispersion of good quality. TGA analysis showed 31% polymer attached.

Other embodiments of the present invention will be apparent to those skilled in the art from consideration of the specification and practice of the invention disclosed herein as well as equivalents thereof. It is intended that the specification and examples be considered as exemplary only, with a true scope and spirit of the present invention being indicated by the following claims and equivalents thereof.

What is claimed is:

1. A modified pigment comprising a pigment having attached at least one organic group, wherein said organic group comprises: the reaction product of at least one electrophile and a nucleophilic polymer which is then further reacted with an acylating agent, wherein the organic group is attached by reacting a diazonium salt having the electrophile with at least one type of pigment and wherein the electrophile is selected from the group consisting of: acyl azides, isocyanates, ketones, aldehydes, anhydrides, amides, imides, imines, α,β-unsaturated ketones and aldehydes, alkyl halides, epoxides, alkyl sulfonates and sulfates, aromatic compounds which undergo addition-elimination reactions, and salts and derivatives thereof.

2. A method of making the modified pigment of claim 1 comprising reacting a pigment having attached a first chemical group with a second chemical group and then further reacting with an acylating agent to form said modified pigment having attached at least one organic group, wherein the second chemical group reacts with the first chemical group and is then further reacted with an acylating agent to form the organic group, and said first chemical group comprises at least one electrophile and said second chemical group comprises at least one nucleophilic polymer, wherein said pigment having attached a first chemical group is prepared by reacting a diazonium salt having the first chemical group with at least one type of pigment to form said pigment having attached a first chemical group, and wherein the first chemical group comprises at least one electrophile selected from the group consisting of: acyl azides, isocyanates, ketones, aldehydes, anhydrides, amides, imides, imines, α,β-unsaturated ketones and aldehydes, alkyl halides, epoxides, alkyl sulfonates and sulfates, aromatic compounds which undergo addition-elimination reactions, and salts and derivatives thereof.

3. The method of claim 2, wherein the first chemical group comprises an alkylsulfate group.

4. The method of claim 2, wherein the first chemical group comprises a (2-sulfatoethyl)-sulphone group.

5. The method of claim 4, wherein the first chemical group is phenyl-(2-sulfatoethyl)-sulphone.

6. The method of claim 2, wherein the nucleophilic polymer is selected from the group consisting of: a polyamine, a polyalkylene oxide, a polyol, a polyacrylate, and salts and derivatives thereof.

7. The method of claim 6, wherein the nucleophilic polymer is a polyamine.

8. The method of claim 7, wherein the nucleophilic polymer is polyethyleneimine.

9. The method of claim 2, wherein said pigment is carbon black.

10. The method of claim 2, wherein said pigment comprises a blue pigment, black pigment, brown pigment, cyan pigment, green pigment, white pigment, violet pigment, magenta pigment, red pigment, yellow pigment, or mixtures thereof.

11. The method of claim 2, further comprising reacting said organic group attached onto said pigment with at least one additional second chemical group, wherein the additional second chemical group comprises at least one electrophile and the organic group comprises at least one nucleophile, or vice versa.

12. The method of claim 11, wherein the additional second chemical group comprises a carboxylic acid group, an acid chloride group, or an anhydride group.

13. The method of claim 11, wherein the additional second chemical group comprises a polymer.

14. The method of claim 13, wherein the polymer is selected from the group consisting of: a polyamine, a polyol, a polyalkylene glycol, a polyacrylate, a protein, a polyamino acid, and salts and derivatives thereof.

15. The method of claim 13, wherein the polymer is a polyacrylate or methacrylate.

16. The modified pigment of claim 1, wherein said organic group comprises: the reaction product of at least one (2-sulfatoethyl)-sulphone group and at least one nucleophilic polymer which is then further reacted with an acylating agent.

17. The modified pigment of claim 16, wherein the organic group is directly attached to the pigment.

18. The modified pigment of claim 16, wherein the (2-sulfatoethyl)-sulphone group is phenyl-(2-sulfatoethyl)-sulphone.

19. The modified pigment of claim 16, wherein said nucleophilic polymer is a poly(vinyl alcohol), polyalkylene glycol, polyamine, or combinations thereof.

20. The modified pigment of claim 16, wherein the nucleophilic polymer is polyethyleneimine or derivatives or salts thereof.

21. The modified pigment of claim 1, wherein the nucleophilic polymer is a poly(vinyl alcohol), a polyalkylene oxide, a polyamine, or combinations thereof.

22. The modified pigment of claim 1, wherein the nucleophilic polymer is polyethyleneimine or derivatives or salts thereof.

23. The modified pigment of claim 1, wherein the acylating agent is succinic anhydride or polyacrylic acid.

24. An ink composition comprising a liquid vehicle and a modified pigment, wherein the modified pigment comprises a pigment having attached at least one organic group, wherein said organic group comprises: the reaction product of at least one electrophile and a nucleophilic polymer which is then further reacted with an acylating agent, wherein the organic group is attached by reacting a diazonium salt having the electrophile with at least one type of pigment and wherein the electrophile is selected from the group consisting of: acyl azides, isocyanates, ketones, aldehydes, anhydrides, amides, imides, imines, α,β-unsaturated ketones and aldehydes, alkyl halides, epoxides, alkyl sulfonates and sulfates, aromatic compounds which undergo addition-elimination reactions, and salts and derivatives thereof.

25. The ink composition of claim 24, wherein the modified pigment comprises a pigment having attached at least one organic group, wherein said organic group comprises: the reaction product of at least one (2-sulfatoethyl)-sulphone group and at least one nucleophilic polymer which is then further reacted with an acylating agent.

26. The ink composition of claim 25, wherein the ink composition is an inkjet ink composition.

27. The ink composition of claim 24, wherein the ink composition is an inkjet ink composition.

* * * * *